United States Patent [19]

Roveti

[11] 3,766,777

[45] Oct. 23, 1973

[54] RECEPTACLE TESTING DEVICE

[76] Inventor: Denes Roveti, 15 Lincoln Center Pk., Annapolis, Md. 20104

[22] Filed: May 4, 1971

[21] Appl. No.: 140,221

[52] U.S. Cl. ............................................ 73/141 AB
[51] Int. Cl. ....................... G01n 19/02, G01r 31/04
[58] Field of Search ............................... 73/141 AB; 324/28 LR

[56] References Cited
UNITED STATES PATENTS

| | | | |
|---|---|---|---|
| 3,420,090 | 1/1969 | Crenshaw | 73/141 AB |
| 3,425,271 | 2/1969 | Hendry | 73/141 AB |
| 3,335,365 | 8/1967 | Libhart | 324/28 CR |
| 2,960,864 | 11/1960 | Watts | 73/141 AB |
| 3,153,956 | 10/1964 | Zorakas | 73/141 AB |

*Primary Examiner*—Charles A. Ruehl
*Attorney*—William Grobman

[57] ABSTRACT

The device of this invention comprises a test instrument for determining the electromechanical integrity of all the contacts of electric receptacles. The device includes male members adapted to be inserted into the normal openings of two or three terminal electrical receptacles and which, when withdrawn, indicate the force with which the contact members of the receptacle would grip the plug as well as the electrical contact resistance of the load carrying blades.

3 Claims, 5 Drawing Figures

PATENTED OCT 23 1973 3,766,777
SHEET 1 OF 2
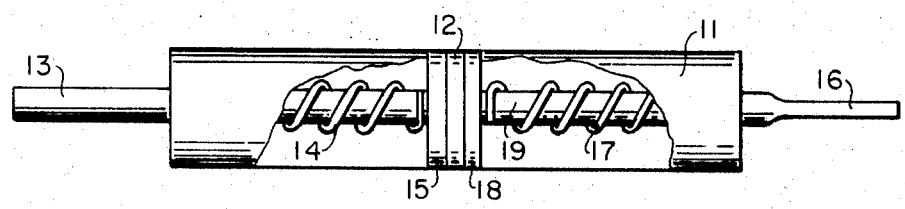
F I G. 1
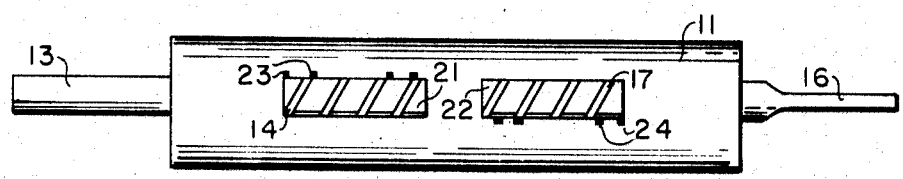
F I G. 2
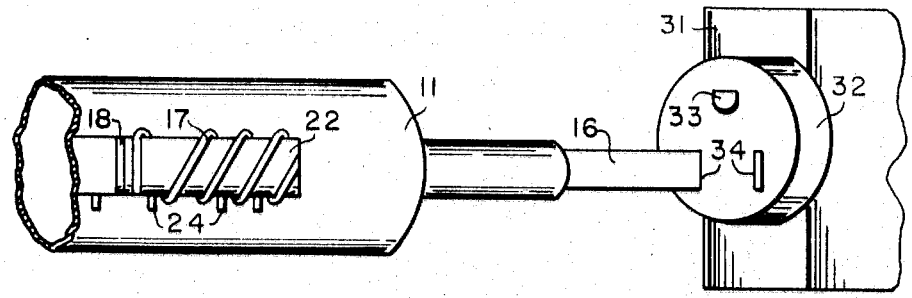
F I G. 3
INVENTOR.
DENES ROVETI
BY
William Grobman

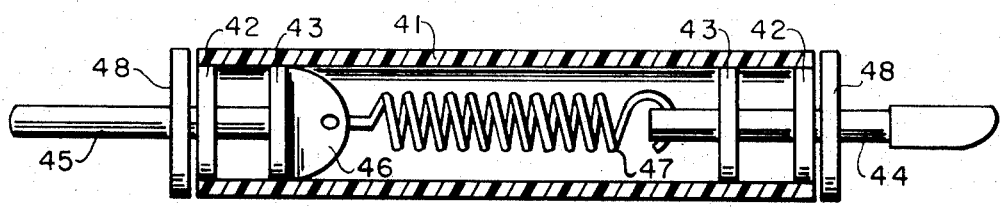
F I G. 4
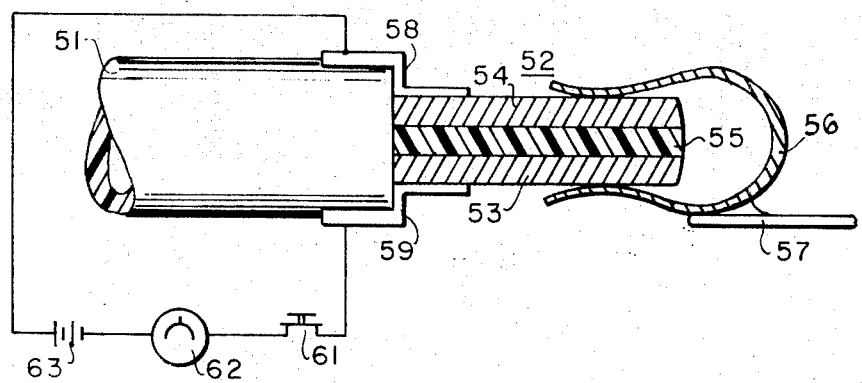
F I G. 5

RECEPTACLE TESTING DEVICE

This invention relates to testing devices and, more particularly, to devices for testing the effectiveness of electrical connectors.

Each day more electrically operated units are produced and more of man's tasks and means of saving human lives are accomplished electrically. Not only in hospitals but in many cases when an electrical appliance is used in the home, the effectiveness of the electrical receptacle or outlet is of importance because of shock and fire hazards. Should a plug not make good contact when a toaster or heater is plugged in, overheating is likely and prompt replacement of the defective receptacle is desirable. Many home or business electrical appliances are "plugged in" and left that way for extended lengths of time, and in such conditions the use receptacle, unless overheated, does not lose its ability to grip the plug and make a good electrical connection. Many potentially dangerous situations can exist when grounding connections are used for appliances or tools in the garden, kitchen, or hospital. Inserting a plug with a deformed blade or ground lug can destroy a receptacle, as will whipping out the line cord. Unfortunately, this is too often done when using vacuum cleaners and floor polishers. There are many situations where extreme care is required. One such example is the use of electrical instruments in hospitals in critically ill patient areas. Should an electrical receptacle fail, a patient's life may be lost. In hospitals, clinics, and the like, electrical equipment has become increasingly important. The shortage of trained personnel, the newly developed electronic monitors and instruments, and new developments in therapy have greatly increased the role of the electrical appliance in the treatment of the critically ill. For example, as a cardiac patient is brought into the coronary care of the hospital room, the electrical monitors needed for his care are often mobile and rolled in, then plugged into the electrical convenience outlet, and are used so long as the patient is treated. When the treatment ends, the monitors are withdrawn and used elsewhere. The electrical receptacles which are used to connect the appliances to the source of electrical energy are used repeatedly, and each time a new appliance is plugged in, the contact material is strained and flexed, until, before long, it looses much of its resilience. When the contact in an electrical receptacle in a hospital or clinic fails to make a suitable hot, neutral, or ground contact, not only can the expensive electrical equipment operating from the receptacle be damaged, but the life of the patient can be in jeopardy. It is important that the condition of each receptacle be periodically determined, and those which show signs of weakness be replaced. This invention provides such a test instrument for this purpose.

It is an object of this invention to provide a new and improved test device.

It is another object of this invention to provide a new and improved test device for electrical receptacles.

It is a further object of this invention to provide a new and improved test device for determining the electrical contact condition of electrical receptacles.

Other objects and advantages of this invention will become apparent as the following description proceeds, which description should be considered together with the accompanying drawings in which:

FIG. 1 is a side view, partially in section, of the test device of this invention;

FIG. 2 is a side view of the test device of FIG. 1;

FIG. 3 is a perspective view of the device of FIG. 1 being used to test an electrical receptacle; and FIGS. 4 and 5 are sectional views of further embodiments of the test device of this invention.

Referring now to the drawings in detail, the reference character 11 designates a generally hollow cylindrical housing or body of electrically insulating material. Inside the body 11 is a partition 12 which divides the housing 11 into two separate parts. In one part of the housing 11 is a member 15 mounted on the end of a rod 13 about which is twisted a coil spring 14. As shown in FIG. 1, the member 15 is in its home position against the partition 12. In the other side of the housing 11 is a second member 18 mounted on the end of a shaft 19 about which a coil spring 17 is wrapped. The two rods 13 and 19 extend through their respective portions of the housing 11 and protrude from the ends thereof. The end of the shaft 19 which protrudes from the housing 11 is flattened to form a flat portion 16. Along the length of the housing 11 are two clear windows 21 and 22 through which the rods 13 and 19 and the springs 14 and 17 can be seen. Alongside each of the clear windows 21 and 22 are indicia 23 and 24. When an electrical receptacle, such as 32 shown in FIG. 3, is to be tested, the flattened portion 16 of the shaft 19 is inserted into each of the two rectangular openings 34. The contacts (not shown) contained within the receptacle 32 grip the portion 16, and the housing 11 can be drawn back away from the wall or partition 31. As the housing 11 is drawn back, the force with which the portion 16 is gripped restrains the rod 19 against the action of the spring 17 which tends to prevent the rod 13 from being pulled out of the end of the housing 11. As the rod is withdrawn from the housing 11, the member 18 is drawn along the interior of the housing, and the member 18 indicates by its position adjacent the indicia 24 the force with which the portion 16 is gripped. For normal operation, the receptacle 31 contact should grip the portion 16 with a force of approximately 8 to 14 ounces. Should the portion 16 be gripped with less force that that, the receptacle 32 can not be considered safe for reliable operation and should be replaced. The other end of the test device, the rod 13, is used in a similar manner to test the force with which the grounding terminal contained in the receptacle 32 within the rounded opening 33 grips a grounding plug member. Since grounding of electrical equipment is very significant, particularly where ill or weak patients are present and where there is the danger of sparking around pure oxygen, the testing of the grounding terminal is of particular importance. The end of the rod 13 is inserted into the opening 33, and the housing 11 is gradually withdrawn from the receptacle 32. The rod 13 is gradually withdrawn by the receptacle 32 from the housing 11 against the action of the spring 14, and the position of the member or pointer 15 at the moment the receptacle releases the rod 13 indicates the force with which it was gripped.

As indicated above, the housing 11 is formed of any suitable material such as a synthetic resin, but it should be an electrical insulating material. The members 15 and 18, which serve as pointers, should be brightly colored so that they can be easily used as pointers and readily can be seen as they move within the windows 21 and 22. The rods 13 and 19 may be metal, or they may be any other suitable material, but since the device of this invention is designed to measure the amount of force the receptacle contacts exert on plug contacts, it is best that the rods 13 and 19 be made from metal similar to that used for the plug contacts themselves. The springs 14 and 17 are compression coil springs which are selected to exert the proper amount of force on the members 15 and 18. As the housing 11 is moved away from the receptacle 32, the members 15 and 18 must be held in position by the force with which the receptacle contact grips the rod 13 or 16. When the force exerted by the spring 14 or 17 becomes greater than that exerted by the receptacle contact, the rod slips out of the receptacle 32. In the meantime, the brightly colored member 15 or 18 has moved with respect to the housing 11, and the amount of movement, which is proportional to the grip of the contact, is indicated by the indicia 23 or 24 adjacent the appropriate window 21 or 22.

In addition to the structure shown in FIGS. 1-3, a simpler device is shown in FIG. 4. The reference character 41 designates a cylindrical housing, usually formed of an electrically insulating material such as a synthetic resin. The interior of the housing 41 is hollow and contains two spaced partitions 43, each with a central perforation. In addition, two end members 42 close off the ends of the housing 41 and they, also, have central perforations. Two shafts, 44 and 45, loosely penetrate the central perforations of the end members 42 and the partitions 43, with one of the shafts penetrating each end of the housing 41. The two shafts 44 and 45 have flattened interior ends 46 with holes formed therein to accept one end of a single expansion coil spring 47. In addition, each of the shafts 44 and 45 has riding on it, outside of the housing 41, a washer 48 which serves as a stop.

The use of the test device of FIG. 4 is the same as that of FIGS. 1-3. The end of the shaft 44 is flattened and the end of shaft 45 is not. Thus, the shaft 44 is inserted into the slots in electrical receptacles where it is gripped by the spring contacts contained therein. The tighter the grip, the more positive the electrical connection. When the shaft 44 is withdrawn from the receptacle, the grip of the contacts tends to hold it against the action of the spring 47. The amount of grip exerted by the contacts can be indicated by the amount of the shaft 44 which is pulled from the housing 41. In a similar manner, the round end of the shaft 45 is inserted into the round hole-the ground terminal-of a grounded or three wire receptacle. The effectiveness of that contact is also measured by the amount that the shaft 45 is pulled from the housing 45 when it is withdrawn from the receptacle.

The device of FIG. 5 is a fragmentary view of a further modification of the apparatus of this invention shown in FIG. 4. A generally hollow cylindrical housing 51 of an electrically insulating material has extending from one end of a shaft designated generally at 52. The blade 52 is fixed in the end of the housing 51 and comprises three layers; two electrically conductive layers 53 and 54 separated by a nonconductive layer 55. Mounted on the shaft 52 adjacent the housing 51 are two electrical contacts 58 and 59. The contact 58 is attached to the layer 54, and the contact 59 is attached to the layer 53. For additional support, the two contacts 58 and 59 are also mounted on the end of the housing 51. A spring contact 56 having a mechanical support 57 is shown gripping the blade 52 comprised of 53, 54, and 55. The two contacts 58 and 59 are connected into a series circuit which includes a push-button switch 61, a meter 62, and a source of electrical energy such as battery 63.

The operation of the device of FIG. 5 extends the operation of the devices shown in FIGS. 1-4. The blade 52 is flattened in most cases to be inserted into the slots of electrical receptacles. Once the balde 52 is so inserted, the contact 56 rests against the two outer layers 53 and 54. In all such contacts, there is a measurable amount of contact resistance, and this contact resistance decreases with the amount of pressure exerted by the contacts. The contact resistance which exists in the contacting of the blade 52 by the contact 56 is measured by the application of electrical energy through the circuit formed thereby, and measuring the current flowing therethrough. This is achieved by depressing the push-button switch 61 which completes the circuit from the source 63, through the meter 62, the switch 61, the contact 59, the layer 53, contact 56, layer 54, contact 58, and back to the source 63. The voltage of the source is known, and the reading of the meter is an indication of the electrical resistance of the circuit. Since the variable in the system of FIG. 5 is the pressure with which the contact 56 grips the blade 52, the reading of the meter 62 is proportional to that grip, accomplishing electrically what the embodiments of FIGS. 1 and 3 do mechanically.

The above specification has described a new and improved device for testing the effectiveness of electrical receptacles. The device is useful for safeguarding of electrical receptacles in all situations where their fitness for use at any time is vital and life supporting. It is realized that the above description may indicate to others additional ways in which the apparatus of this invention may be used without eparting from its principles and spirit. It is, therefore, intended that this invention be limited only by the scope of the appended claims.

What is claimed is:

1. A device for testing the effectiveness of female electrical receptacles to grip male plug members, said device comprising a hollow generally cylindrical body, a partition in said body dividing the interior of said body into two compartments, a shaft longitudinally movable in each of said compartments with one end of each shaft extending through its respective end of said body, means within each compartment for urging the shaft in that compartment fully into the compartment and for resisting the withdrawal of each shaft from its compartment, each of said shafts having its end which extends outside of said body fashioned to fit within female contacts and to be gripped thereby, indicia on said body, and indicator means attached to each of said shafts cooperating with said indicia to indicate the relative amount of force with which said shaft is gripped by electrical contacts as the shaft is withdrawn from said contacts against the action of said urging means.

2. The device defined in claim 1 wherein said body is formed of electrical insulating material.

3. The device defined in claim 1 wherein each of said urging means comprises a resilient device having one end bearing against a portion of said shaft and the other end bearing against a portion of said body so that said resilient device resists the withdrawing movement of said shaft from said body.

* * * * *